(12) United States Patent
MacIsaac et al.

(10) Patent No.: US 6,301,353 B1
(45) Date of Patent: Oct. 9, 2001

(54) COMMON AUTOMATIC ROUTE SELECTION LEADING DIGIT STRINGS

(75) Inventors: Brian MacIsaac, Carleton Place; Steven G. Lyon, Constance Bay, both of (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/630,188

(22) Filed: Aug. 1, 2000

Related U.S. Application Data (63) Continuation of application No. 09/023,464, filed on Feb. 13, 1998, which is a continuation-in-part of application No. 08/612,432, filed on Mar. 7, 1996, now abandoned.

(51) Int. Cl.[7] .................................................. H04M 7/00
(52) U.S. Cl. ........................... 379/234; 379/198; 379/239
(58) Field of Search ................................. 379/144, 216, 379/231, 232, 233, 234, 242, 243, 244, 355, 198, 288

(56) References Cited

U.S. PATENT DOCUMENTS

| | | | |
|---|---|---|---|
| 4,571,463 | * | 2/1986 | Shefler ................................. 379/355 |
| 4,661,974 | * | 4/1987 | Bales et al. ........................... 379/198 |
| 5,272,749 | * | 12/1993 | Masek .................................. 379/216 |
| 5,325,422 | * | 6/1994 | Ladd ................................... 379/67.1 |
| 5,479,494 | * | 12/1995 | Clitherow ............................. 379/144 |

* cited by examiner

*Primary Examiner*—Ahmad Matar
*Assistant Examiner*—Bing Bui
(74) *Attorney, Agent, or Firm*—Harold C. Baker; Robert A. Wilkes; Robert G. Hendry (57) ABSTRACT

In a PABX switching system: (a) apparatus for receiving dialed digits relating to a call, (b) apparatus for storing a table of groups of predetermined numbers of initial digits and for each group of initial digits storing a subtable, each subtable being comprised of a list of quantities of digits expected to follow a corresponding group of initial digits, each quantity being correlated with a central office or an alternate communication route, each list of quantities of digits being sorted in ascending order, (c) apparatus for selecting a group of initial digits in the table corresponding to first digits of the received dialed digits, and for pointing to a central office or alternate communication route corresponding to a lowest quantity of digits in a subtable of the selected group of initial digits, (d) apparatus for using the central office or alternate communication route for completion of the call in the event the dialed digits contain a quantity of digits corresponding to the lowest quantity of digits, (e) apparatus for detecting a dialed digit in excess of the lowest quantity of digits and for pointing instead to a next higher quantity of digits in the subtable of the selected group of initial digits, and (f) apparatus for repeating step (e) until no dialed digit is detected which is in excess of a highest quantity of digits pointed to and apparatus for using the corresponding communication route listed in the subtable for completion of the call.

5 Claims, 7 Drawing Sheets

AUTOMATIC ROUTE SELECTION ASSIGNMENT

LEADING DIGITS: 9

SECOND DIAL TONE (YES/NO): NO          COR GROUP NUMBER:12

| DIGITS DIALLED | NUMBER OF DIGITS TO FOLLOW | TERMINATION TYPE | NUMBER |
|---|---|---|---|
| 416 | 4 | ROUTE | 1 |
| 416 | 7 | ROUTE | 2 |
| 976 | 4 | ROUTE | 3 |
| 976 | 7 | ROUTE | 4 |
| 976555 | 4 | ROUTE | 5 |
| 976976 | 4 | ROUTE | 6 |

COMMON AUTOMATIC ROUTE SELECTION LEADING DIGIT STRINGS

This application is a continuation application of U.S. patent application Ser. No. 09/023,464 filed Feb. 13, 1998 which is a continuation-in-part of application Ser. No. 08/612,432 filed Mar. 7, 1996 now abandoned.

FIELD OF THE INVENTION

This invention relates to the field of communications, and in particular to the operation of a PABX.

BACKGROUND TO THE INVENTION

In the operation of a PABX, a subscriber dials a sequence of digits which are used by the PABX to complete a call to a line or trunk identified by at least some of the dialed digits. In the event the subscriber dials a prefix such as a 9, the PABX connects the calling subscriber line to an outgoing trunk, whereupon subsequently dialed digits following the 9 are passed to a central office to which the outgoing trunk is connected, for completion of the call.

The call numbering plan used in e.g. North America has used a convention which avoids confusion between area code numbers and central office numbers. Central office numbers have been restricted to the middle digit of the first three digits being between 2 and 9 inclusive, and the middle digit of area codes have been restricted to 0 or 1.

These restrictions have been removed. Area codes and office codes are now interchangeable.

In addition, in the past each telephone company had a monopoly in local service, and the dialed numbers automatically were detected by central office equipment owned by that telephone company. Long distance service was either provided by the local company (in some jurisdictions), or the long distance carrier was selected by the local telephone company. This monopoly has been broken, and the local subscriber can select the long distance company to use.

This creates a difficulty for PABXs, since they must be able to distinguish between digits dialed within a PABX, digits dialed which are to a called subscriber accessable via a local central office, and digits dialed which are to be connected via an alternate service provider, without being able to distinguish between area codes and other numbers based on the value of the second digit of the called number that is dialed, as in the past. Yet it is important to do so automatically, in order to take advantage of savings which can be obtained by use of alternate service providers.

For example, in order to route to central office 416 in the local area, a PABX owner would have to program an automatic route selection subsystem in the PABX to interpret the number 9416+4 digits to follow (the number 9 designating an out-of-PABX call) as meaning that the call should be routed to the local central office, and to interpret the number 9416+7 digits to follow as meaning that the call should be routed to an alternate service provider. It is generally not possible to do this on common PABXs, since the prefix 9 automatically causes the call to be routed to the local central office.

SUMMARY OF THE INVENTION

The present invention provides means and method for a PABX owner to allow subscribers to access trunks and lines defined by the area codes and central office codes which do not conform to the previous standard, and at the same time to access the alternate service providers, via the PABX.

In accordance with an embodiment of the present invention, the PABX can be programmed with the same leading and dialed digits, but with different digits to follow (dtf), and yet will follow different call completion communication routes. The different routes are determined by the different numbers of digits to follow. In this manner the PABX owner can program various call completion routes for varying lengths of total number of digits dialed by the subscriber without having to explicitly define all digit combinations of the automatic route selection subsystem.

In accordance with an embodiment of the present invention, in a PABX switching system, a method and apparatus for establishing a communication route from dialed digits is comprised of (a) receiving dialed digits relating to a call, (b) storing a table of groups of initial digits and for each group of initial digits storing a subtable, each subtable being comprised of a list of quantities of digits expected to follow a corresponding group of initial digits, each quantity being correlated with a communication route, each list of quantities of digits being sorted in ascending order, (c) detecting the values of the received dialed digits, determining whether an initial group of digits has been dialed which corresponds to a group of initial digits stored in the table, counting a number of digits following the initial group of dialed digits and generating a digits-to-follow (dtf) signal, and selecting the communication route by an index corresponding to the value of the dtf signal within the subtable corresponding to the values of the initial digits, and (d) using the communication route for completion of the call.

In accordance with another embodiment, in a PABX switching system, a method and apparatus for establishing a communication route from dialed digits is comprised of (a) receiving dialed digits relating to a call, (b) storing a table of groups of initial digits and for each group of initial digits storing a subtable, each subtable being comprised of a list of quantities of digits expected to follow a corresponding group of initial digits, each quantity being correlated with a communication route, each list of quantities of digits being sorted in ascending order, (c) selecting a group of initial digits in the table corresponding to first digits of the dialed digits, and pointing to a communication route corresponding to a lowest quantity of digits in a subtable of selective group of initial digits, (d) using the communication route for completion of the call in the event the dialed digits contain a quantity of digits corresponding to the lowest quantity of digits, (e) detecting a dialed digit in excess of the quantity of digits and pointing instead to a next highest quantity of digits in the subtable of the selected group of initial digits, and (f) repeating step (e) until no dialed digit is detected which is in excess of a highest quantity of digits pointed to and using a corresponding communication route listed in the subtable for completion of the call.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1A:
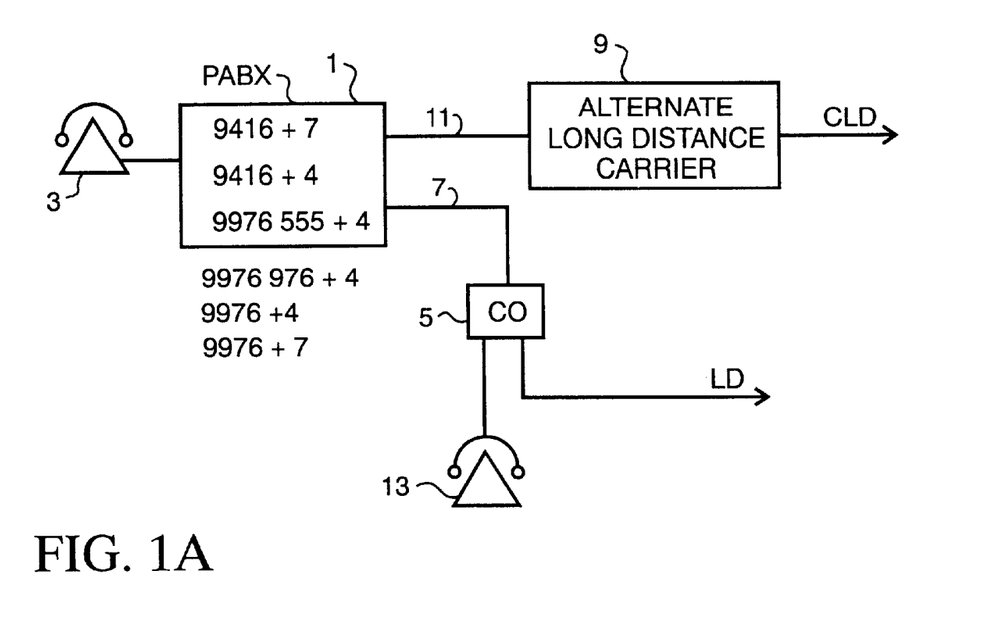
FIGS. 1A and 1B illustrate block diagrams of a communication system for implementing the present invention.

Referring first to FIG. 1A, a representative PABX 1 is shown, to which a representative telephone set 3 is connected. The PABX is connected to a central office 5 via trunks 7, and to equipment 9 of an alternate carrier via trunks 11. The central office 5 is connected to a representative telephone set 13, as well as to long distance trunks LD to other offices. The alternate carrier equipment 9 is also connected via its own long distance trunks CLD to remote alternate carrier equipment.

Now it may be seen from the figure that the subscriber can dial, following the initial digit 9, 416+4 digits to follow (dtf) (a total of 8 digits, or a total of 7 digits following the out-of-PABX designator 9) and the PABX must connect the call to central office 5. The subscriber can dial 9 416+7 dtf (a total of 11 digits, or 10 following the digit 9) and the PABX must connect the call to the alternate carrier equipment 9. The subscriber can dial 9 976 555+4 dtf (a total of 11 digits, or 10 following the initial digit 9), and the PABX must connect the call to the local central office. The subscriber can dial 9 976 976+4 dtf (a total of 11 digits, or 10 digits following the initial digit 9) and the PABX must connect the call to the local central office.

Figure 2:
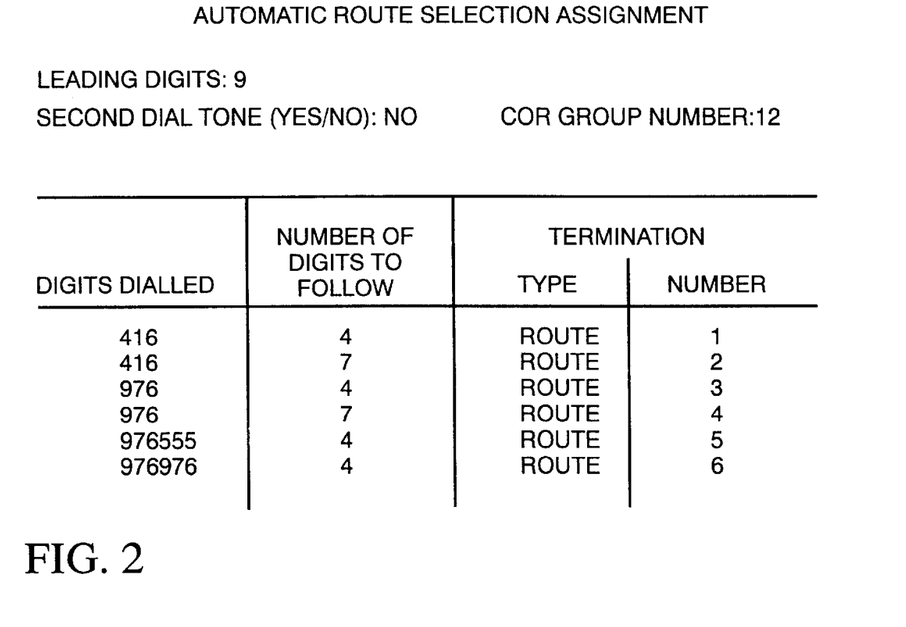
FIG. 2 is a chart illustrating communication routes for selection based on digits dialed.

FIG. 2 illustrates the above example in tabular form. The first column lists the digits dialed following the initial 9, the second column lists the dtf, the third column lists the route type, and the fourth column lists the different route numbers that the PABX is to follow to complete the call properly.

Figure 1B:
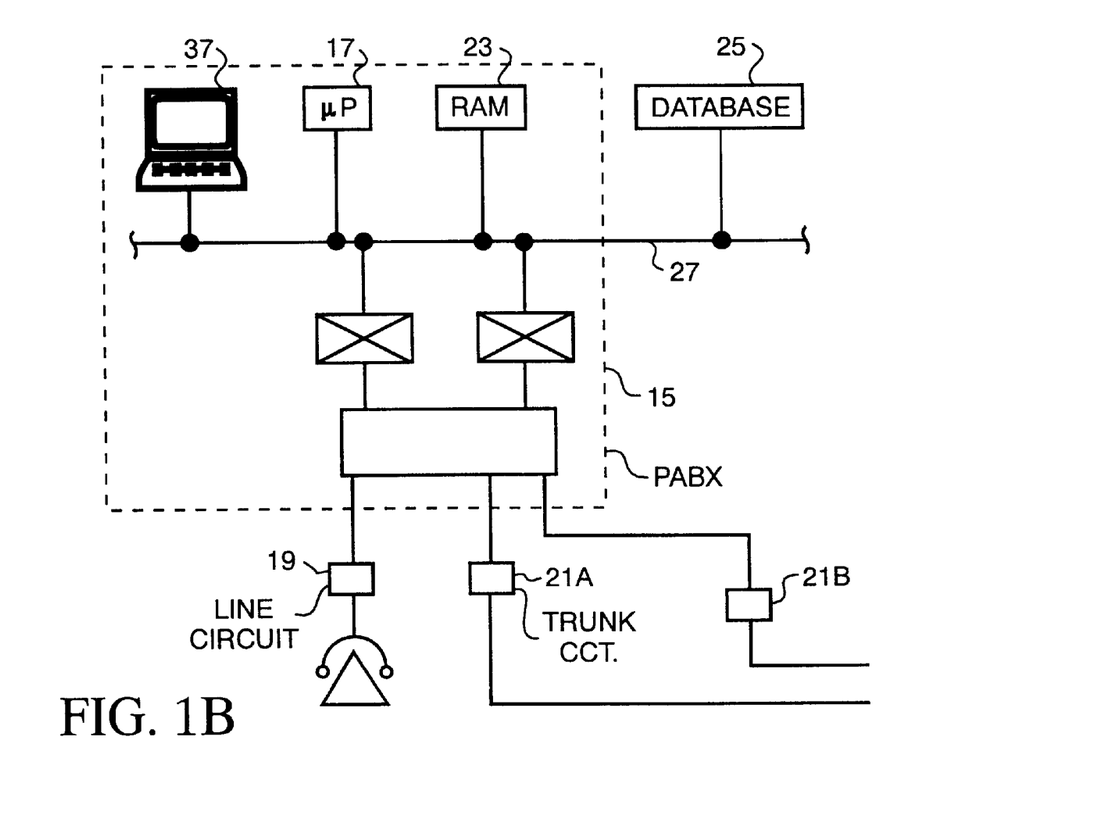

FIG. 1B is a block diagram of a PABX communication switching system of a kind which can be used to implement the present invention. The basic system is sold by Mitel Corporation as type SX2000, and is described in U.S. Pat. No. 4,615,028 issued Sep. 30, 1986 and U.S. Pat. No. 4,616,360 issued Oct. 7, 1986 which are assigned to Mitel Corporation. In order to avoid redundancy, a detailed description of that system will not be repeated herein, since its structure is known to persons skilled in the art. However, it will be noted that central processor 17 controls the system, causing connection of calls from, to and between lines and trunks 19 and 21A and 21B via correspondingly numbered interface circuits.

The trunks 21A represent trunks to a central office such as central office 5, shown in FIG. 1, and trunks 21B represent trunks to alternate carrier equipment 9 shown in FIG. 1.

The PABX 15 includes a digit tree in RAM 23, which in conjunction with processor 17 is used to decode the communication route for a call corresponding to digits received from a line or trunk. In the past, when a prefix digit 9 is decoded it caused the processor to command the system to route the remaining digits to a central office via a trunk 21A.

In accordance with the present invention, a memory 25, which retains a specialized database to be used as an adjunct to the digit tree as will be described below (and which memory will be described below as database 25), is connected to bus 27 of the system 15 for access by processor 17.

Figure 3:
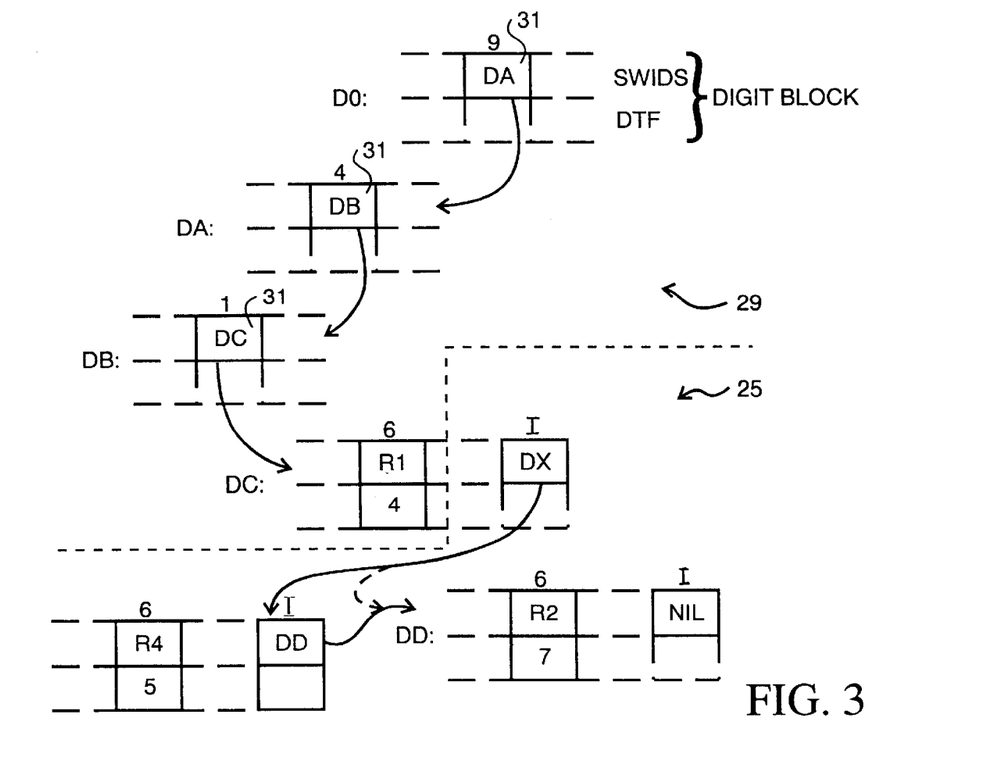
FIGS. 3, 3A and 3B are diagrams illustrating an embodiment of the invention and variations thereof.

FIG. 3 illustrates schematically the digit tree 29 which is contained in RAM 23. The prior art is shown above the dotted line. The digit tree is a database containing pointers 31 from identified received digits in a trunk or lower branch of the tree to higher branches which carry digits corresponding to later dialed digits. For example, a first digit 9 is looked up in a lower branch DO has a pointer to a branch DA. The digit 4, dialed next in the sequence 416 is looked up in branch DA and has a pointer to the branch DB. The next dialed digit 1 is looked up in branch DB and has a pointer to branch DC. The next dialed digit 6 is looked up in branch DC and has a pointer to communication route R1 (the identity of which can be seen immediately below the numeral 6). Thus the prior art system only allows the dialed digits 9416 to only resolve to a single communication route.

In accordance with an embodiment of the present invention, the database 25 (shown below the dotted line) is comprised of a digit index element I, which has a pointer to a further tree branch DD. The initial digit tree branch DC which looks up route R1 corresponding to the received digit 6 now returns the communication route R1 in the event that there are only 4 digits are received that follow the dialed 6, but in the event that there are 7 digits to follow, the index to branch DD is used, which returns the communication route R2.

The index data element in branch DD (which is extended into database 25) can point to branch DD, or can contain a nil entry, in which case there will be no pointing to any further branch. It can alternatively point to branch DD and the digit 6 element of branch DD can be nil also.

The branch DD (and higher branches) can have its own index I, which can point to a higher branch, or can have a nil entry, indicating that there are no higher branches to be accessed, which will be the case when there are no further received digits (digits dialed by the subscriber for analysis by the CPU), and no number of digits to follow greater than that indicated in branch DD.

Figure 3A:
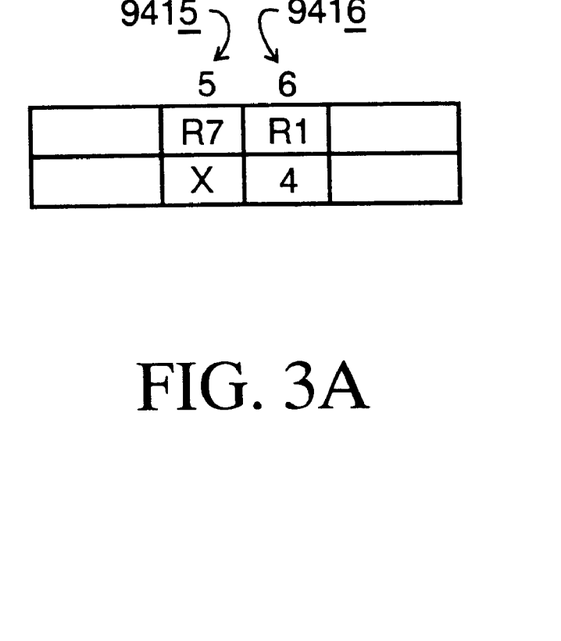
Figure 3B:
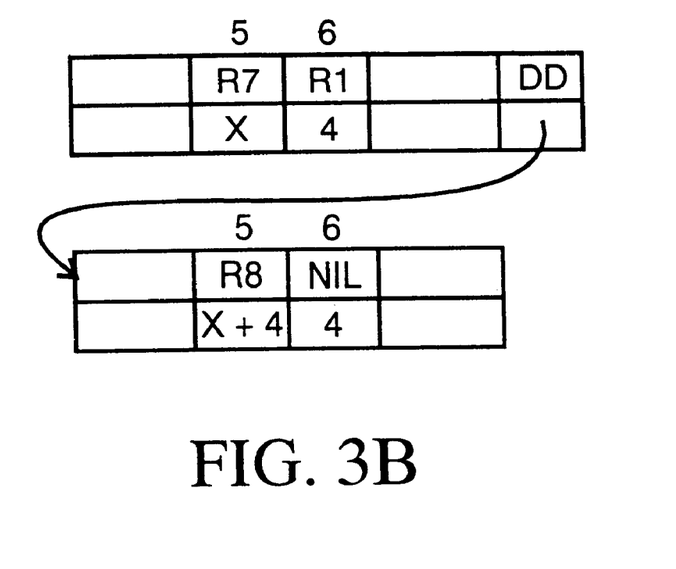

Branch DD may contain representations of more than one set of initial digits, as shown in FIG. 3A. So it is with branch DD. 9415 could have more entries associated with it, in contrast to 9416 which does not, as shown in FIG. 3B. The entry below Dd or the entry below nil can be "nil".

The route corresponding to the received digit located in the highest branch which has a nil index, designates the communication route which the processor uses in place of the route provided by the original digit tree in RAM 23, to complete the call. The route selected can be to any of a variety of alternate long distance or local service providers, a central office, etc.

Thus it may be seen that the route selected depends on the number of digits dialed, with the branch in the extended tree depending on an index to an extension of the database. It should be noted, however, that the extension depends on the digit element increasing. Thus for example the digit number extension of branch DC must be smaller than the digits to follow (dtf) of branch DD.

In the event the digit element in branch DC is nil, the system assumes that the smallest number of digits to follow (4) are to be received, and the route R1 is selected. In the event the digit index element in branch DC points to branch DD, the system assumes that the next largest number of digits to follow (7) are to be received, and the route R2 is selected. In the event the index number in branch DD points to another branch, e.g. DE (not shown), it is assumed that another number of digits to follow, e.g. 10, are to be received, and another route, e.g. route R3 may be used to complete the call. Branch DE can have a nil index entry, or another pointer to another branch which identifies another expected number of digits to follow.

It will also be recognized that each of the branches of the same tier as DC will have a structure similar to the one shown. For example, instead of 9416 resulting in branch DC, 9976 will point to branch DC' (not shown), which will contain an index number to accommodate additional numbers of digits to follow, as described above.

It should also be noted that the use of index numbers differ from a simple tree structure for the reason that once a particular number of digits to follow is exceeded, there is a pointer to a tree branch which both identifies a quantity of digits to follow (as distinct from a branch resulting from a particular received digit), as well as a particular communication route which is to be used by the processor to complete a call. Every subsequent digit which is dialled in excess of the expected number resulting from the index calls up another index which points to another higher number of expected digits to follow, and a different communication route, not simply a branch that depends on the actual digit which is received, as is the case in the digit tree 29.

Figure 4:
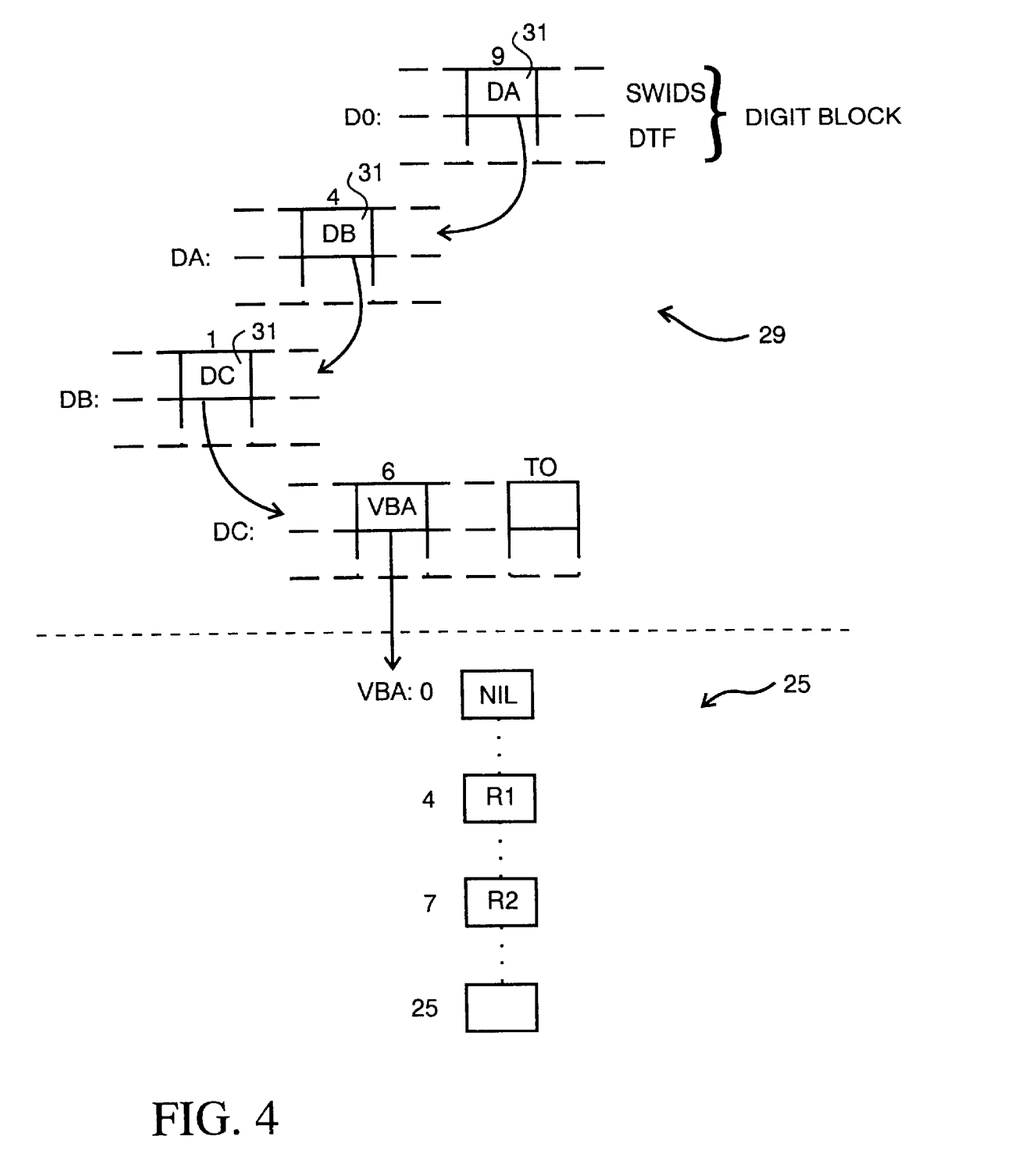
FIG. 4 is a diagram illustrating another embodiment of the invention.

The index that is used can be the actual number of digits to follow, as shown in another embodiment illustrated in FIG. 4. In this case the digits to follow is determined by the system 15 receiving the dialed digits and counting the decoded digits using processor 17, or a specialized digit receiver which both decodes and counts the received digits. The number of digits is determined by the processor timing an interval following each digit and declaring completion of dialing following a predermined interval. A time-out or digit completion digit can be provided, marking what is the final digit in the received digit string.

With the number of digits to follow following the initial digits known at the point of digit tree branch DC, that known number of digits can be used as an index into database 25, pointed to by the pointer from digit 6 in branch Dc as to branch VBA. In this embodiment of the database 25, the digits to follow are sorted in increasing order, associated with route identifiers. For example, if the number of digits to follow the initial digits 9416 is 7, the route R2 is identified and is returned to processor 17 to identify the communications route to use to complete the call. The route is selected by the use of the index 7 immediately identifying the record containing route R2, instead of waiting for digits to be received and traversing the tree to increasing levels as in the embodiment of FIG. 3. If the digits to follow indicates nil, there is no 9416+0 entry.

Figure 5:
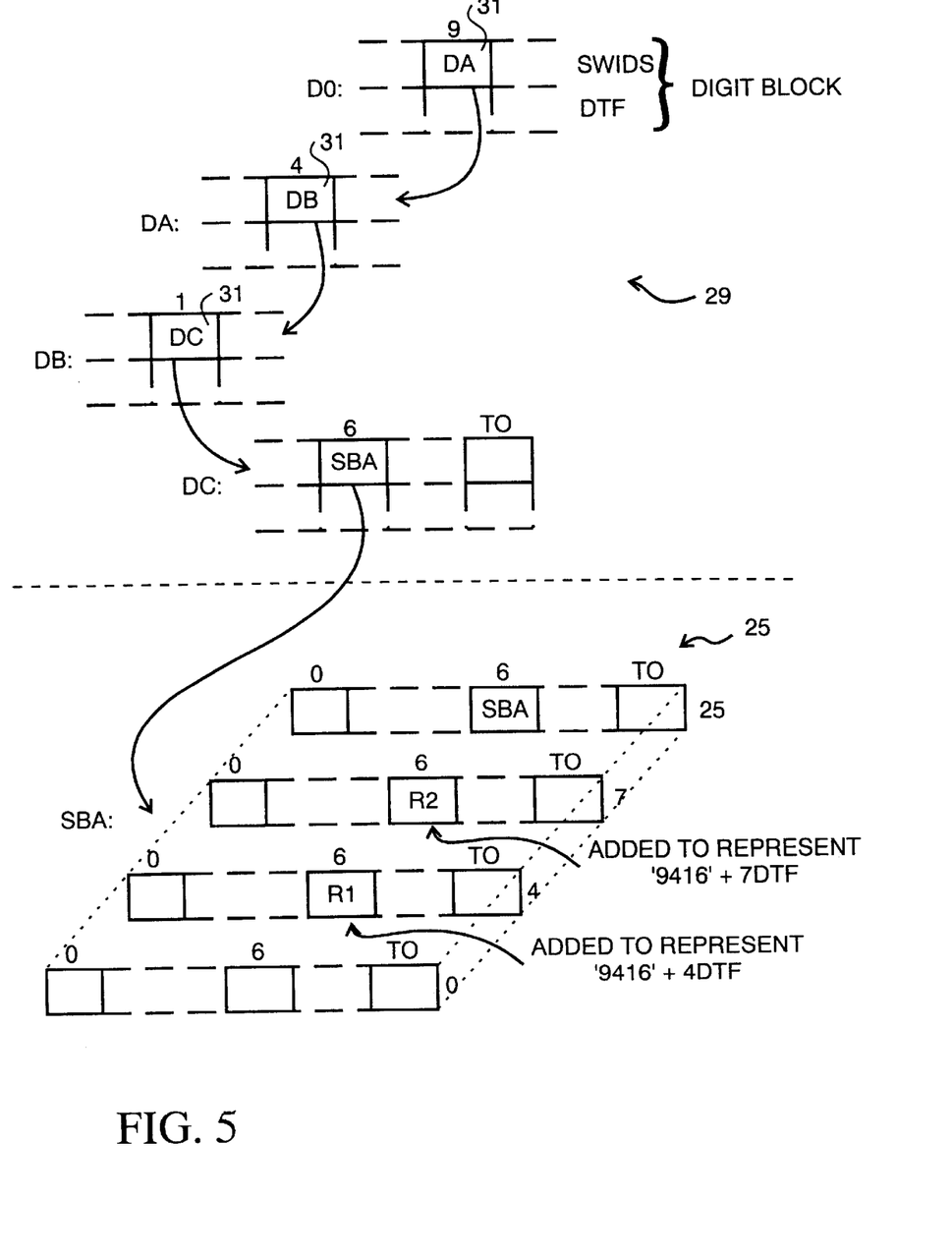
FIG. 5 is a diagram illustrating another embodiment of the invention.

Another embodiment is shown in FIG. 5, in which, instead of the index of digit 6 in branch Dc pointing to branch VBa, a superblock of branches SBa is pointed to. The superblock is formed of an array of records which is 0 to TO digits wide by the number of digits to follow (25 being shown) deep (TO designating time-out). The digits to follow forms the index into the superblock, and the route is stored at the intersection of the last digit in the initial digit string and the digits to follow value.

Figure 6:
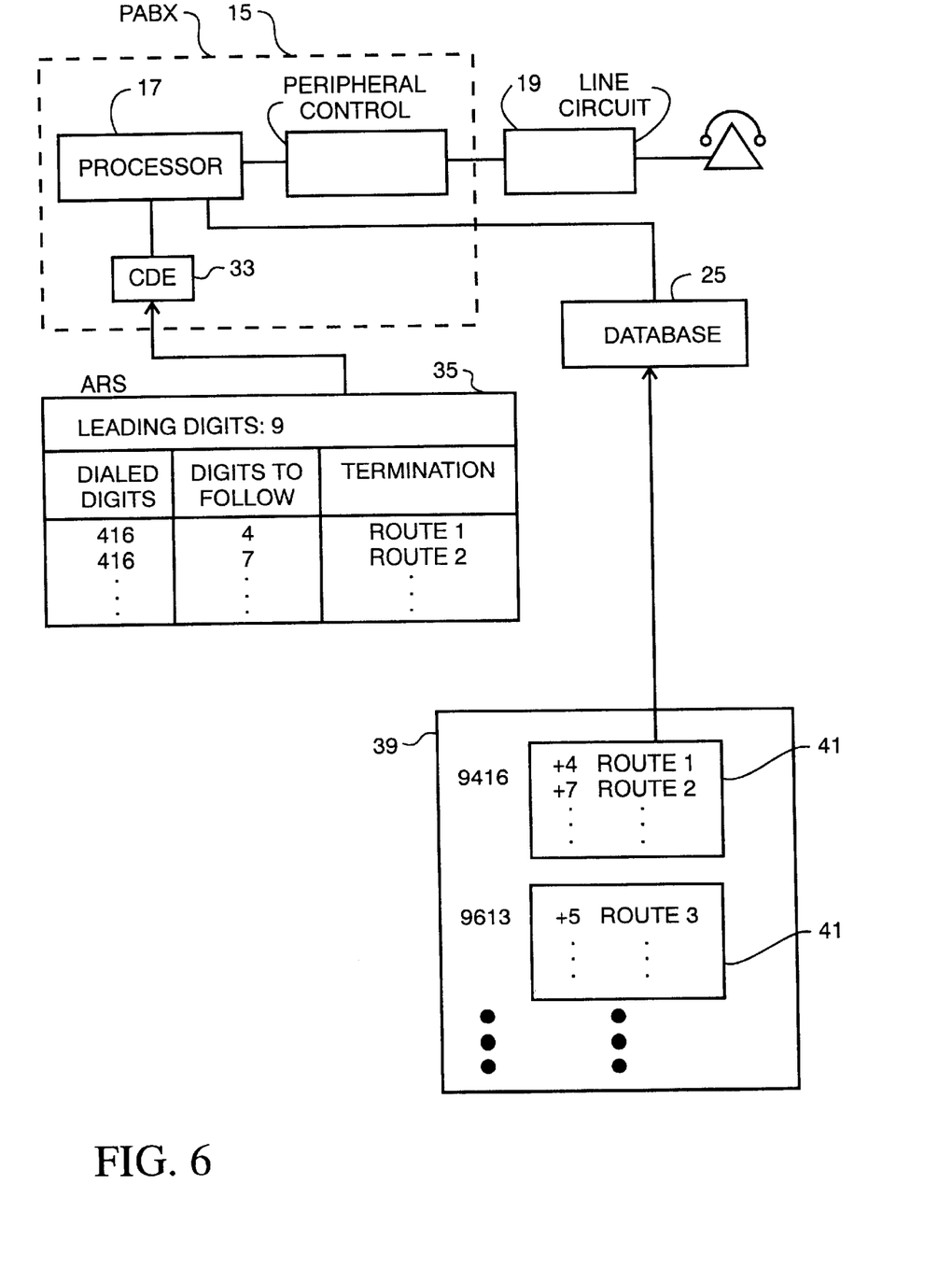
FIG. 6 is a block diagram illustrating a structure of an embodiment of the invention.

FIG. 6 illustrates a structure which can be used to implement the embodiments above. The processor communicates with a data entry system 33, which generates a table 35 on display 37. The table allows entry, by the operator of the PABX, of a route selection list. Thus for example, the operator enters, for leading digit 9, a list of dialed digits (e.g. 416) against digits to follow (e.g. 4, 7), with a correleation to routes (terminations Route 1, Route 2, etc.).

The processor translates the data entered in table 35 to database 25, which is shown as being comprised of a table 39. Table 39 lists the groups of leading and dialed digits, e.g. 9416, 9613, etc. Each group has its own subgroup which is a termination list, listing digits to follow (dtf) against routes, e.g. dtf 4 against Route 1, dtf 7 against Route 2 for 9416; dtf 5 against Route 3 for 9613, etc. Within each subgroup, the dtf values are sorted in increasing values.

Figure 7:
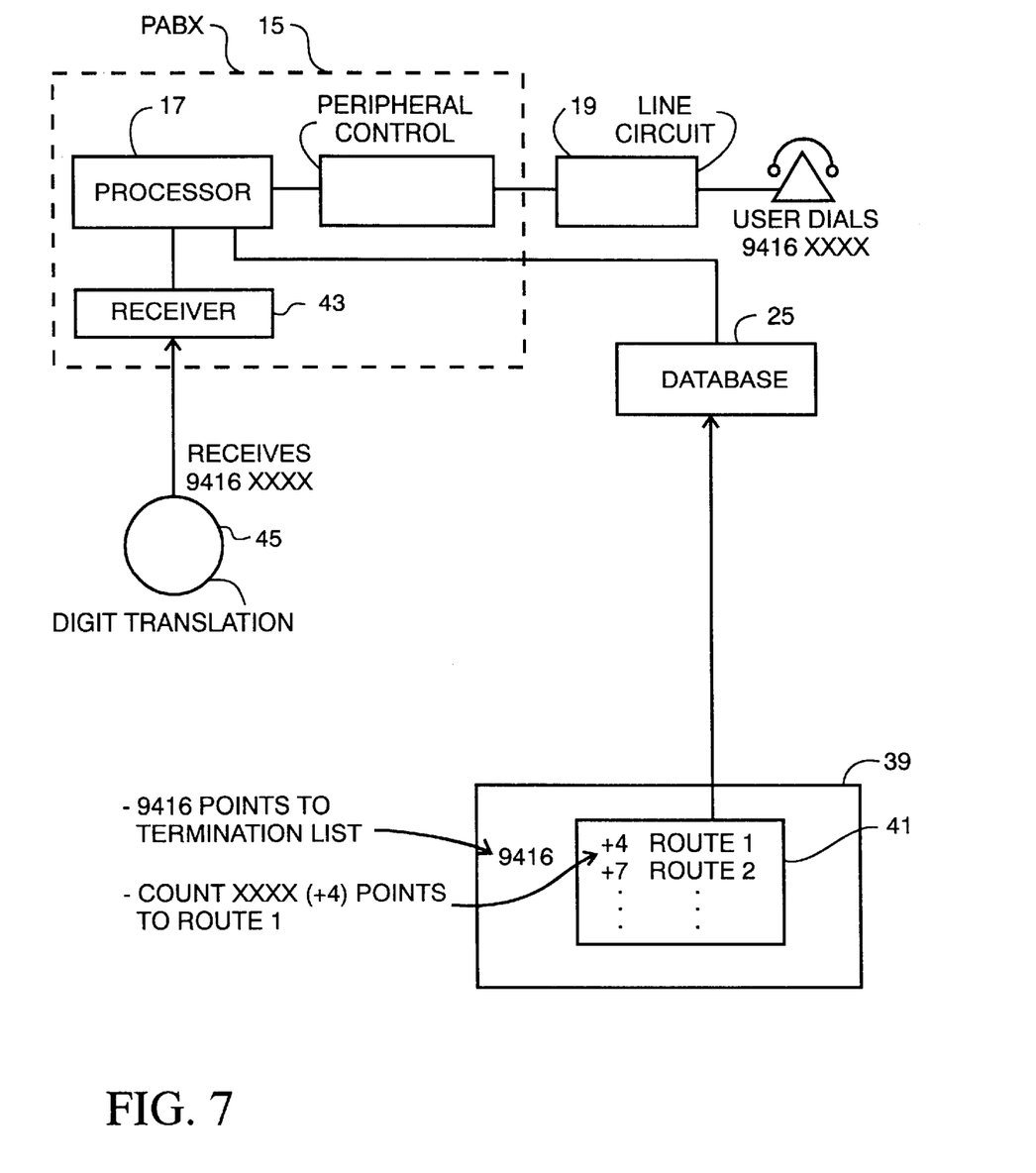
FIG. 7 is a diagram illustrating operation of the invention.

FIG. 7 illustrates how the structure operates. A receiver 43 receives the dialed digits, and using processor 17 translates the received digits (shown as translator functional block 45). For example, receipt of digits 9416-xxxx (wherein xxxx can designate any dialed digits) causes translator 45 to point to table 39 entry 9416. The translator 45 counts the number of digits to follow (4, from xxxx), which is used as the index to the entry of subgroup 41, which returns Route 1. This data is provided to the processor 17 which processes the call using communication route 1.

It should be noted that the database can be contained in RAM 23 with other data, and stored on a hard disk drive or other non-volatile memory structure in the PABX 15 (FIG. 1B).

A person understanding this invention may now conceive of alternative structures and embodiments or variations of the above. All of those which fall within the scope of the claims appended hereto are considered to be part of the present invention.

We claim:

1. In a PABX switching system, a method of establishing a communication route from dialed digits comprising:
    (a) receiving an out of PABX digit,
    (b) receiving seven or ten dialed digits relating to a call,
    (c) storing a table of groups of three initial digits after the out of PABX digit and for each group of three initial digits storing a subtable, each subtable being comprised of a list of four or seven digits expected to follow a corresponding group of initial digits, each quantity being correlated with a communication route, each list of quantities of digits being sorted in ascending order,
    (d) selecting a group of initial digits in the table corresponding to first three digits of said dialed digits, and pointing to a communication route corresponding to four digits in a subtable of selective group of initial digits,
    (e) using said communication route for completion of said call in the event the dialed digits contain four digits,
    (f) detecting a dialed digit in excess of four digits and pointing instead to a next highest quantity of digits in said subtable of the selected group of initial digits,
    (g) repeating step (f) until no dialed digit is detected which is in excess of a highest quantity of digits pointed to and using a corresponding communication route listed in the subtable for completion of said call.

2. A method as defined in claim 1 including detecting the values of the received dialed digits, determining whether an initial group of three digits has been dialed which corresponds to a group of initial digits stored in the table, counting a number of digits following the initial group of dialed digits and generating a digits-to-follow (dtf) signal, and selecting said communication route by an index corresponding to the value of the dtf signal within the subtable corresponding to the values of the initial digits.

3. A method as defined in claim 1 in which the number of tables corresponds to a preselected list of groups of initial digits, and processing said call using all of the dialed digits without counting the number of digits following the initial group of dialed digits and without selecting a communication route from a table in the event the initial group of digits that has been dialed does not correspond to a stored group of initial digits.

4. In a PABX switching system, a method of establishing a communication route from dialed digits comprising:

(a) receiving an out of PABX digit, (b) receiving seven or ten dialed digits relating to a call, (c) storing a table of three groups of initial digits and for each group of initial digits storing a subtable, each subtable being comprised of a list of quantities of digits expected to follow a corresponding group of initial digits, each quantity being correlated with a communication route, each list of quantities of digits being sorted in ascending order, (d) detecting the values of the received dialed digits, determining whether an initial group of three digits has been dialed which corresponds to a group of initial digits stored in the table, counting a number of digits following the initial group of dialed digits and generating a digits-to-follow (dtf) signal, and selecting said communication route by an index corresponding to the value of the dtf signal within the subtable corresponding to the values of the initial digits, and (e) using said communication route for completion of said call.

5. A method as defined in claim 4 in which the number of tables corresponds to a preselected list of groups of three initial digits, and processing said call using all of the dialed digits without counting the number of digits following the initial group of dialed digits and without selecting a communication route from a table in the event the initial group of digits that has been dialed does not correspond to a stored group of initial digits.

* * * * *